US011264831B2

(12) United States Patent
Hsia (10) Patent No.: US 11,264,831 B2
(45) Date of Patent: Mar. 1, 2022

(54) SOLID-STATE LIGHTING WITH AN EMERGENCY DRIVER

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/313,988

(22) Filed: May 6, 2021

(65) Prior Publication Data

US 2021/0265859 A1    Aug. 26, 2021

Related U.S. Application Data

(63) Continuation-in-part of application No. 17/213,519, filed on Mar. 26, 2021, which is a continuation-in-part of application No. 17/151,606, filed on Jan. 18, 2021, which is a continuation-in-part of application No. 17/122,942, filed on Dec. 15, 2020, which is a continuation-in-part of application No. 17/099,450, filed on Nov. 16, 2020, which is a continuation-in-part of application No. 17/076,748, (Continued)

(51) Int. Cl.
| | |
|---|---|
| *H02J 1/10* | (2006.01) |
| *H02J 9/06* | (2006.01) |
| *H05B 45/14* | (2020.01) |
| *H05B 45/3725* | (2020.01) |
| *H05B 45/355* | (2020.01) |
| *H02J 7/04* | (2006.01) |

(52) U.S. Cl.
CPC ............... *H02J 9/065* (2013.01); *H02J 7/04* (2013.01); *H05B 45/14* (2020.01); *H05B 45/355* (2020.01); *H05B 45/3725* (2020.01)

(58) Field of Classification Search
CPC ...... H02J 9/065; H02J 7/04; H02J 7/02; H02J 2207/20; H05B 45/14; H05B 45/355; H05B 45/3725; H05B 45/10; H05B 45/382; H05B 45/395; H05B 45/385; H05B 45/44; H05B 45/46; H05B 45/48; H05B 45/50; Y02B 20/30; F21K 9/232
See application file for complete search history.

(56) References Cited

U.S. PATENT DOCUMENTS

| | | | |
|---|---|---|---|
| 2011/0026277 A1* | 2/2011 | Strijker | H02M 3/33523 363/21.07 |
| 2012/0176046 A1* | 7/2012 | Tsai | H05B 45/10 315/185 R |

FOREIGN PATENT DOCUMENTS

WO    WO-2012119244 A1 *    9/2012    ......... H02M 1/4258

* cited by examiner

*Primary Examiner* — Omar Rojas Cadima
(74) *Attorney, Agent, or Firm* — Han IP PLLC; Andy M. Han (57) ABSTRACT

An LED luminaire emergency driver comprises a rechargeable battery, a charger circuit, an LED driving circuit, and a charging and discharging control circuit. The LED luminaire emergency driver is intended to automatically supply a first supplied voltage to drive LED arrays in an event of a normal power failure. The LED driving circuit is configured to convert a terminal voltage from the rechargeable battery into the first supplied voltage when a line voltage from AC mains is unavailable. The charging and discharging control circuit comprises a relay switch and a transistor circuit assembly configured to sense a charging voltage, to control switching between normal power and an emergency power to operate the LED arrays, and to meet regulatory requirements without operational ambiguity and safety issues.

20 Claims, 5 Drawing Sheets

Related U.S. Application Data filed on Oct. 21, 2020, which is a continuation-in-part of application No. 17/026,903, filed on Sep. 21, 2020, which is a continuation-in-part of application No. 17/016,296, filed on Sep. 9, 2020, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH AN EMERGENCY DRIVER

CROSS-REFERENCE TO RELATED APPLICATIONS

The present disclosure is part of a continuation-in-part (CIP) application of U.S. patent application Ser. No. 17/213,519, filed 26 Mar. 2021, which is part of CIP application of U.S. patent application Ser. No. 17/151,606, filed 18 Jan. 2021, which is part of CIP application of U.S. patent application Ser. No. 17/122,942, filed 15 Dec. 2020, which is part of CIP application of U.S. patent application Ser. No. 17/099,450, filed 16 Nov. 2020, which is part of CIP application of U.S. patent application Ser. No. 17/076,748, filed 21 Oct. 2020, which is part of CIP application of U.S. patent application Ser. No. 17/026,903, filed 21 Sep. 2020, which is part of CIP application of U.S. patent application Ser. No. 17/016,296, filed 9 Sep. 2020, which is part of CIP application of U.S. patent application Ser. No. 16/989,016, filed 10 Aug. 2020, which is part of CIP application of U.S. patent application Ser. No. 16/929,540, filed 15 Jul. 2020, which is part of CIP application of U.S. patent application Ser. No. 16/904,206, filed 17 Jun. 2020, which is part of CIP application of U.S. patent application Ser. No. 16/880,375, filed 21 May 2020, which is part of CIP application of U.S. patent application Ser. No. 16/861,137, filed 28 Apr. 2020, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire that uses an emergency driver configured to operate the LED luminaire no matter whether a line voltage from alternate-current (AC) mains is available or not.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with an emergency lighting and power system such that after the LED lamp or the LED luminaire is installed on a ceiling or in a room, the emergency lighting and power system can be readily connected with the LED lamp, the LED luminaire, or others on site to meet regulatory requirements, especially without further retrofits or modifications of the LED lamp or the LED luminaire.

SUMMARY

An LED luminaire comprising one or more LED arrays, a normal driver, and an emergency driver is used to replace a fluorescent or an LED lamp normally operated with the AC mains. The one or more LED arrays comprise a forward voltage across thereof. The normal driver comprises a power supply unit that powers the one or more LED arrays when a line voltage from the AC mains is available. The power supply unit comprises a power switch configured to turn the power to the power supply unit on or off. In other words, the power supply unit receives the line voltage from switched AC mains. When the line voltage is inputted, the power supply unit generates a second supplied voltage with respect to the second ground reference and a rated current to normally operate the one or more LED arrays. When the line voltage is unavailable, the emergency driver is automatically started to provide the first supplied voltage to the one or more LED arrays to operate thereof.

The emergency driver comprises a rechargeable battery, a charger circuit, an LED driving circuit, and a charging and discharging control circuit comprising a relay switch. The relay switch comprises a coil, a first input electrical terminal, and a second input electrical terminal. The charger circuit comprises a first switching transformer and a diode rectifier assembly comprising two rectifier diodes and respectively coupled to two electrical conductors denoted as "L" and "N" of alternate-current (AC) mains to receive the line voltage. The charger circuit is configured to generate a charging voltage with respect to a first ground reference to charge the rechargeable battery when the line voltage is available. The rechargeable battery comprises a positive potential terminal and a negative potential terminal with a terminal voltage across thereof. A voltage at the positive potential terminal is denoted as B+ with respect to the negative potential terminal, which connects to the first ground reference. The two electrical conductors "L" and "N" are coupled to un-switched AC mains. The charger circuit further comprises at least one input capacitor coupled between the two rectifier diodes and configured to smooth out an input direct-current (DC) voltage, $V_{in}$. The first switching transformer comprises a first winding, a second winding, and a third winding. The charger circuit further comprises at least one electronic switch, an auxiliary circuit, and a first diode rectifier circuit comprising a first diode and a first capacitor.

The first diode rectifier circuit is coupled to the third winding and configured to rectify and smooth out an AC voltage from the third winding to generate the charging voltage greater than a rated value of the terminal voltage. The at least one electronic switch is coupled in series with the first winding 405 configured to be controlled by the auxiliary circuit to operate the charger circuit in a switching mode. When the at least one electronic switch is turned off in a time-off ($t_{off}$) period, the first diode is forward biased and conducts, and an output voltage with respect to the first ground reference from the third winding is the charging voltage. When the at least one electronic switch 408 is turned on in a time-on ($t_{on}$) period, the first diode is reverse biased and does not conduct, and the output voltage with respect to the first ground reference goes to a low level representing a voltage of minus $(N_2/N_1) \cdot V_{in}$, where $N_1$ is a turn number of the first winding, $N_2$ is a turn number of the third winding, and $V_{in}$ is the input DC voltage across the at least one input capacitor.

The LED driving circuit comprises a second switching transformer and an optocoupler. The LED driving circuit is configured to receive the terminal voltage and to convert the terminal voltage into a first supplied voltage with respect to a second ground reference when the line voltage is unavailable. The optocoupler comprises an infrared emitting diode and a phototransistor and is configured to operate in response to the first supplied voltage and to enable the relay switch to relay the first supplied voltage and to operate the one or more LED arrays when the line voltage is unavailable. The second switching transformer comprises a primary winding and an auxiliary winding. The LED driving circuit further comprises a first electronic switch and a second electronic switch, both coupled to the primary winding and configured to control charging and discharging of the primary winding and to operate the second switching transformer. The second switching transformer further comprises a secondary winding whereas the LED driving circuit further comprises a voltage reference and diode rectifier circuit comprising a second diode rectifier circuit. The LED driving circuit further comprises an output capacitor configured to smooth out a rectified voltage from the voltage reference and diode rectifier circuit and to reduce voltage ripples in the first supplied voltage. The second diode rectifier circuit is coupled to the secondary winding and configured to convert an AC voltage from the secondary winding into the first supplied voltage whereas the first supplied voltage is coupled to the second input electrical terminal of the relay switch to operate the one or more LED arrays when the line voltage is unavailable.

The second switching transformer further comprises a sensing winding electrically coupled to the positive potential terminal of the rechargeable battery via an inductor and magnetically coupled to the auxiliary winding. When the line voltage is available, the sensing winding stores energy in an increasing magnetic field. When the line voltage is unavailable, a falling magnetic field in the sensing winding reverses a voltage polarity and generates a first control voltage and a second control voltage on the auxiliary winding, respectively triggering the first electronic switch and the second electronic switch to turn on in a first part of a cycle and to turn off in a second part of a cycle. The first part of the cycle and the second part of the cycle are combined in a full cycle representing a reciprocal of a switching frequency.

The charging and discharging control circuit further comprises a transistor circuit assembly. The relay switch is configured to relay the first supplied voltage to the one or more LED arrays when the line voltage is unavailable. The relay switch further comprises a pair of input electrical terminals denoted as "E" and "E'". The pair of input electrical terminals are configured to receive a pull-in voltage to operate the coil. The pull-in voltage is associated with the operation of the relay switch. It is a voltage required to cause the relay switch to operate. It is related to drop-out voltage, which is the voltage at which the relay switch returns to its rest position. The pull-in voltage is always greater than the drop-out voltage. The relay switch further comprises an output electrical terminal configured to relay either a second supplied voltage provided by an external power supply unit or the first supplied voltage to the output electrical terminal. The second supplied voltage is configured to appear at the first input electrical terminal when the line voltage is available whereas the first supplied voltage is configured to appear at the second input electrical terminal when the line voltage is unavailable. The transistor circuit assembly further comprises a first transistor circuit, a second transistor circuit coupled to the first transistor circuit, a current guided diode, a second capacitor coupled in parallel with the coil. Both the first transistor circuit and the second transistor circuit are further coupled to the phototransistor to receive bias voltages and to build up the pull-in voltage across the second capacitor to operate the coil when the line voltage is unavailable.

The infrared emitting diode and the phototransistor are respectively coupled to the secondary winding and the auxiliary winding. When the first electronic switch and the second electronic switch are turned on and off in an alternate part of the cycle, the first supplied voltage is built up to increase a current flowing through the infrared emitting diode, thereby transferring a high-level voltage signal to the phototransistor. In this sense, the optocoupler is configured to transfer a digital signal of "1". The high-level voltage signal renders to enable the charging and discharging control circuit and to operate the coil when the line voltage is unavailable. In other words, the high-level voltage signal at the phototransistor is configured to feed the transistor circuit assembly to operate the coil when the line voltage is unavailable.

The first transistor circuit and the second transistor circuit respectively comprise a first transistor and a second transistor whereas both the first transistor and the second transistor are configured to receive the charging voltage. When the line voltage is available, the first transistor is turned on with the second transistor turned off to disable the coil, thereby relaying the second supplied voltage to the one or more LED arrays to operate thereof. When the line voltage becomes available in an event of power outage, the charging voltage appears to turn on the first transistor and to pull down the high-level voltage signal. When the high-level voltage signal is pulled down, both the first electronic switch and the second electronic switch are disabled to inactivate the second switching transformer with the first supplied voltage shut down. The LED driving circuit further comprises a first resistor and a second resistor respectively coupled between the first electronic switch and the phototransistor and between the second electronic switch and the phototransistor to balance out a voltage difference.

The charging and discharging control circuit further comprises a status indicator circuit comprising three color LED indicators, a Zener diode, and a third transistor. The Zener diode and the third transistor are configured to detect charging conditions and to control the three color LED indicators to individually light up in response to the charging conditions whereas the charging conditions comprise availability of the line voltage, a normal battery charging condition, and a charging malfunction. The charging and discharging control circuit further comprises a current sensing circuit and at least one pair of electrical contacts coupled between the rechargeable battery and the current sensing circuit. The at least one pair of electrical contacts is configured to connect to the rechargeable battery for charging and discharging thereof and to prevent the rechargeable battery from being drained when not in use. The at least one pair of electrical contacts comprise electrical contacts in a switch, a relay, and a jumper, or electrical terminals accommodated for jumper wires. The current sensing circuit comprises a sensing resistor and a diode. When the charging voltage is available to charge the rechargeable battery, a voltage drop is across the sensing resistor. The status indicator circuit detects the voltage drop and determines that it is the normal battery charging condition. When the rechargeable battery is not connected with the current sensing circuit, or a charging current is prohibited due to a malfunction of the rechargeable battery, the voltage drop is not available. In this case, the status indicator circuit determines that it is the charging malfunction. Once the charging voltage is available, the status indicator circuit determines that the line voltage is available and makes one of the color LED indicators associated with such an indication to light up. Each of the at least one electronic switch, the first electronic switch, and the second electronic switch comprises either a metal-oxide semiconductor field-effect transistor (MOSFET) or a bipolar junction transistor (BJT).

The power supply unit further comprises a main full-wave rectifier and an input filter. The main full-wave rectifier is coupled to receive the line voltage from the switched AC mains to convert it into a main DC voltage. The input filter is configured to suppress electromagnetic interference (EMI) noises. The power supply unit further comprises a power switching converter comprising a main transformer and a power factor correction (PFC) and power switching circuit. The PFC and power switching circuit is coupled to the main full-wave rectifier via the input filter and configured to improve a power factor, to reduce voltage ripples, and to convert the main DC voltage into the second supplied voltage. The second supplied voltage is configured to couple to the one or more LED arrays to operate thereon when the line voltage is available. The power switching converter further comprises a pulse width modulation (PWM) control circuit and a pair of dimming input ports denoted as "DD" configured to receive a 0-to-10 V signal, a 1-to-10 V signal, a PWM signal, or a signal from a variable resistor for luminaire dimming applications. The PFC and power switching circuit is a current source. The power switching converter further comprises a rectifiers and filter configured to generate the second supplied voltage. When the line voltage is available, the second supplied voltage will appear at the first electrical terminal "A" in the emergency driver and loop back to the one or more LED arrays via the output electrical terminal "C" to operate thereof.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a first, a second, a third, and so forth does not necessarily represent a part that is mentioned in an ordinal manner, but a particular one.

DETAILED DESCRIPTION OF THE INVENTION

Figure 1:
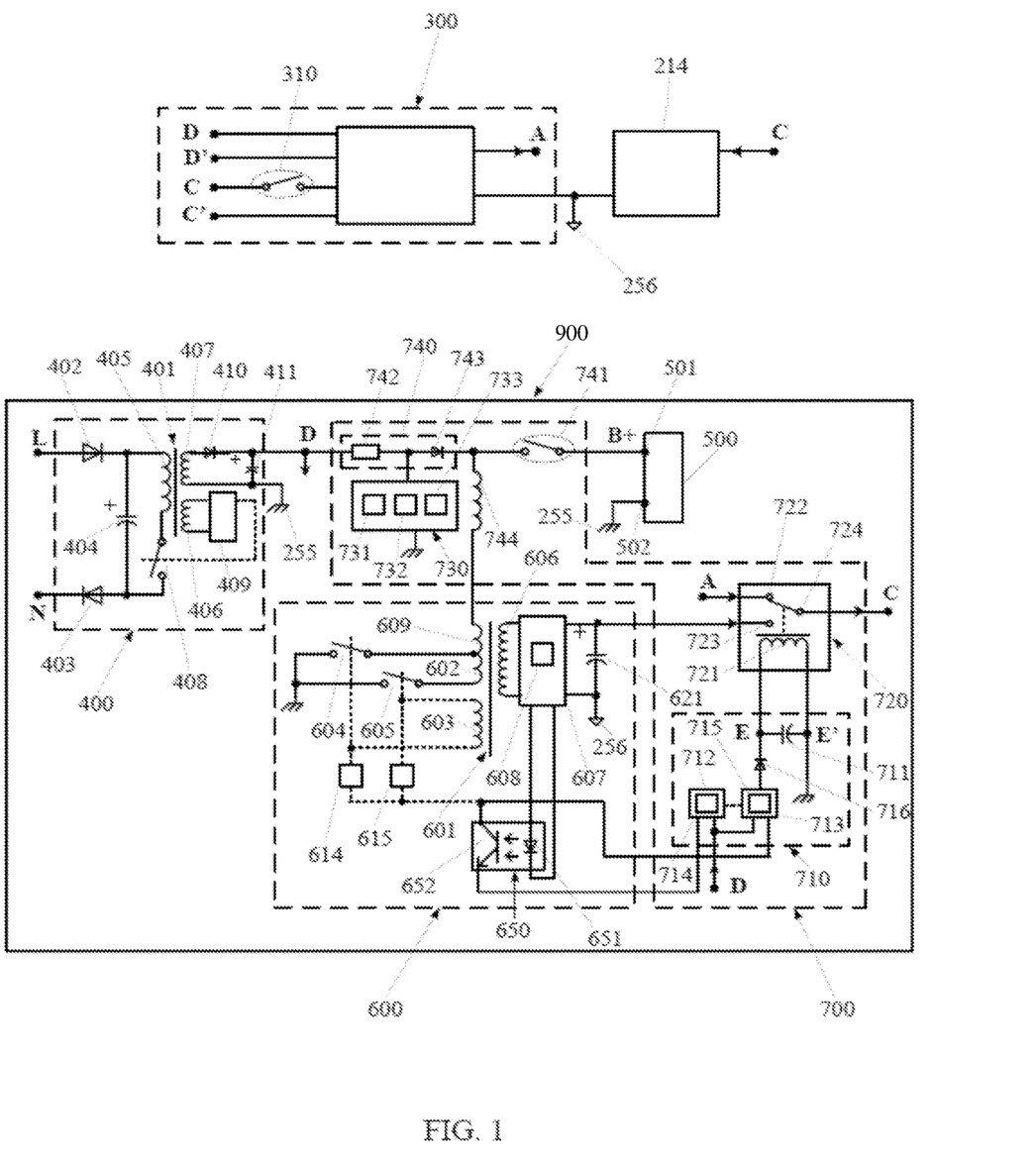
FIG. 1 is a block diagram of an LED luminaire emergency driver according to the present disclosure.

FIG. 1 is a block diagram of an LED luminaire emergency driver according to the present disclosure. The LED luminaire emergency driver 900 comprises a rechargeable battery 500, a charger circuit 400, an LED driving circuit 600, and a charging and discharging control circuit 700 comprising a relay switch 720. The relay switch 720 comprises a coil 721, a first input electrical terminal 722, and a second input electrical terminal 723. The charger circuit 400 comprises a first switching transformer 401 and a diode rectifier assembly comprising two rectifier diodes 402 and 403 respectively coupled to two electrical conductors denoted as "L" and "N" of alternate-current (AC) mains to receive a line voltage. The charger circuit 400 is configured to generate a charging voltage with respect to a first ground reference 255 to charge the rechargeable battery 500 when the line voltage is available. The rechargeable battery 500 comprises a positive potential terminal 501 and a negative potential terminal 502 with a terminal voltage across thereof. A voltage at the positive potential terminal 501 is denoted as B+ with respect to the negative potential terminal 502, which connects to the first ground reference 255. In FIG. 1, the two electrical conductors "L" and "N" are coupled to un-switched AC mains. The charger circuit 400 further comprises at least one input capacitor 404 coupled between the two rectifier diodes 402 and 403 and configured to smooth out an input direct-current (DC) voltage, $V_{in}$. The first switching transformer 401 comprises a first winding 405, a second winding 406, and a third winding 407. The charger circuit 400 further comprises at least one electronic switch 408, an auxiliary circuit 409, and a first diode rectifier circuit comprising a first diode 410 and a first capacitor 411. The first diode rectifier circuit is coupled to the third winding 407 and configured to rectify and smooth out an AC voltage from the third winding 407 to generate the charging voltage greater than a rated value of the terminal voltage. The at least one electronic switch 408 is coupled in series with the first winding 405 and configured to be controlled by the auxiliary circuit 409 to operate the charger circuit 400 in a switching mode. When the at least one electronic switch 408 is turned off in a time-off ($t_{off}$) period, the first diode 410 is forward biased and conducts, and an output voltage with respect to the first ground reference 255 from the third winding 407 is the charging voltage. When the at least one electronic switch 408 is turned on in a time-on ($t_{on}$) period, the first diode 410 is reverse biased and does not conduct, and the output voltage with respect to the first ground reference 255 goes to a low level representing a voltage of minus $(N_2/N_1) \cdot V_{in}$, where $N_1$ is a turn number of the first winding 405, $N_2$ is a turn number of the third winding 407, and $V_{in}$ is the input DC voltage across the at least one input capacitor 404.

The LED driving circuit 600 comprises a second switching transformer 601 and an optocoupler 650. The LED driving circuit 600 is configured to receive the terminal voltage and to convert the terminal voltage into a first supplied voltage with respect to a second ground reference 256 when the line voltage is unavailable. The optocoupler 650 comprises an infrared emitting diode 651 and a phototransistor 652 and is configured to operate in response to the first supplied voltage and to enable the relay switch 720 to relay the first supplied voltage and to operate external LED arrays 214 when the line voltage is unavailable. The second switching transformer 601 comprises a primary winding 602 and an auxiliary winding 603. The LED driving circuit 600 further comprises a first electronic switch 604 and a second electronic switch 605, both coupled to the primary winding 602 and configured to control charging and discharging of the primary winding 602 and to operate the second switching transformer 601. The second switching transformer 601 further comprises a secondary winding 606 whereas the LED driving circuit 600 further comprises a voltage reference and diode rectifier circuit 607 comprising a second diode rectifier circuit 608. The LED driving circuit 600 further comprises an output capacitor 621 configured to smooth out a rectified voltage from the voltage reference and diode rectifier circuit 607 and to reduce voltage ripples in the first supplied voltage. The second diode rectifier circuit 608 is coupled to the secondary winding 606 and configured to convert an AC voltage from the secondary winding 606 into the first supplied voltage whereas the first supplied voltage is coupled to the second input electrical terminal 723 of the relay switch 720 to operate the external LED arrays 214 when the line voltage is unavailable.

The second switching transformer 601 further comprises a sensing winding 609 electrically coupled to the positive potential terminal 501 of the rechargeable battery 500 via an inductor 744 and magnetically coupled to the auxiliary winding 603. When the line voltage is available, the sensing winding 609 stores energy in an increasing magnetic field. When the line voltage is unavailable, a falling magnetic field in the sensing winding 609 reverses a voltage polarity and generates a first control voltage and a second control voltage on the auxiliary winding 603, respectively triggering the first electronic switch 604 and the second electronic switch 605 to turn on in a first part of a cycle and to turn off in a second part of a cycle. The first part of the cycle and the second part of the cycle are combined in a full cycle representing a reciprocal of a switching frequency.

The charging and discharging control circuit 700 further comprises a transistor circuit assembly 710. The relay switch 720 is configured to relay the first supplied voltage to the external LED arrays 214 when the line voltage is unavailable. The relay switch 720 further comprises a pair of input electrical terminals denoted as "E" and "E'". The pair of input electrical terminals are configured to receive a pull-in voltage to operate the coil 721. The pull-in voltage is associated with the operation of the relay switch 720. It is a voltage required to cause the relay switch 720 to operate. It is related to drop-out voltage, which is the voltage at which the relay switch 720 returns to its rest position. The pull-in voltage is always greater than the drop-out voltage. The relay switch 720 further comprises an output electrical terminal 724 configured to relay either a second supplied voltage provided by an external power supply unit 300 or the first supplied voltage to the output electrical terminal 724. The second supplied voltage is with respect to the second ground reference 256 and configured to appear at the first input electrical terminal 722 when the line voltage is available whereas the first supplied voltage is configured to appear at the second input electrical terminal 723 when the line voltage is unavailable. In FIG. 1, the external power supply unit 300 may further comprises a pair of dimming input ports denoted as "DD" configured to receive a 0-to-10 V signal, a 1-to-10 V signal, a PWM signal, or a signal from a variable resistor for luminaire dimming applications. The transistor circuit assembly 710 further comprises a first transistor circuit 712, a second transistor circuit 713 coupled to the first transistor circuit 712, a current guided diode 716, a second capacitor 711 coupled in parallel with the coil 721. Both the first transistor circuit 712 and the second transistor circuit 713 are further coupled to the phototransistor 652 to receive bias voltages and to build up the pull-in voltage across the second capacitor 711 to operate the coil 721 when the line voltage is unavailable.

The infrared emitting diode 651 and the phototransistor 652 are respectively coupled to the secondary winding 606 and the auxiliary winding 603. When the first electronic switch 604 and the second electronic switch 605 are turned on and off in an alternate part of the cycle, the is built up to increase a current flowing through the infrared emitting diode 651, thereby transferring a high-level voltage signal to the phototransistor 652. In this sense, the optocoupler 650 is configured to transfer a digital signal of "1". On the other hand, when the first supplied voltage becomes unavailable, the optocoupler 650 is configured to transfer a digital signal of "0". That is to say that the optocoupler 650 is configured to operate in response to the first supplied voltage. The high-level voltage signal renders to enable the charging and discharging control circuit 700 to operate the coil 721 when the line voltage is unavailable. In other words, the high-level voltage signal at the phototransistor 652 is configured to feed the transistor circuit assembly 710 to operate the coil 721 when the line voltage is unavailable.

The first transistor circuit 712 and the second transistor circuit 713 respectively comprise a first transistor 714 and a second transistor 715 whereas both the first transistor 714 and the second transistor 715 are configured to receive the charging voltage. When the line voltage is available, the first transistor 714 is turned on with the second transistor 715 turned off to disable the coil 721, thereby relaying the second supplied voltage to the external LED arrays 214 to operate thereof. When the line voltage becomes available in an event of power outage, the charging voltage appears to turn on the first transistor 714 and to pull down the high-level voltage signal. When the high-level voltage signal is pulled down, both the first electronic switch 604 and the second electronic switch 605 are disabled to inactivate the second switching transformer 601 with the first supplied voltage shut down. In FIG. 1, the LED driving circuit 600 further comprises a first resistor 614 and a second resistor 615 respectively coupled between the first electronic switch 604 and the phototransistor 652 and between the second electronic switch 605 and the phototransistor 652 to balance out a voltage difference.

The charging and discharging control circuit 700 further comprises a status indicator circuit 730 comprising three color LED indicators 731, a Zener diode 732, and a third transistor 733. The Zener diode 732 and the third transistor 733 are configured to detect charging conditions and to control the three color LED indicators 731 to individually light up in response to the charging conditions whereas the charging conditions comprise availability of the line voltage, a normal battery charging condition, and a charging malfunction. In FIG. 1, the charging and discharging control circuit 700 further comprises a current sensing circuit 740 and at least one pair of electrical contacts 741 coupled between the rechargeable battery 500 and the current sensing circuit 740. The at least one pair of electrical contacts 741 is configured to connect to the rechargeable battery 500 for charging and discharging thereof and to prevent the rechargeable battery 500 from being drained when not in use. The at least one pair of electrical contacts 741 comprise electrical contacts in a switch, a relay, and a jumper, or electrical terminals accommodated for jumper wires. The current sensing circuit 740 comprises a sensing resistor 742 and a diode 743. When the charging voltage is available to charge the rechargeable battery 500, a voltage drop is across the sensing resistor 742. The status indicator circuit 730 detects the voltage drop and determines that it is the normal battery charging condition. When the rechargeable battery 500 is not connected with the current sensing circuit 740, or a charging current is prohibited due to a malfunction of the rechargeable battery 500, the voltage drop is not available. In this case, the status indicator circuit 730 determines that it is the charging malfunction. Once the charging voltage is available, the status indicator circuit 730 determines that the line voltage is available and makes one of the color LED indicators associated with such an indication to light up. Each of the at least one electronic switch 408, the first electronic switch 604, and the second electronic switch 605 comprises either a metal-oxide semiconductor field-effect transistor (MOSFET) or a bipolar junction transistor (BJT).

Figure 2:
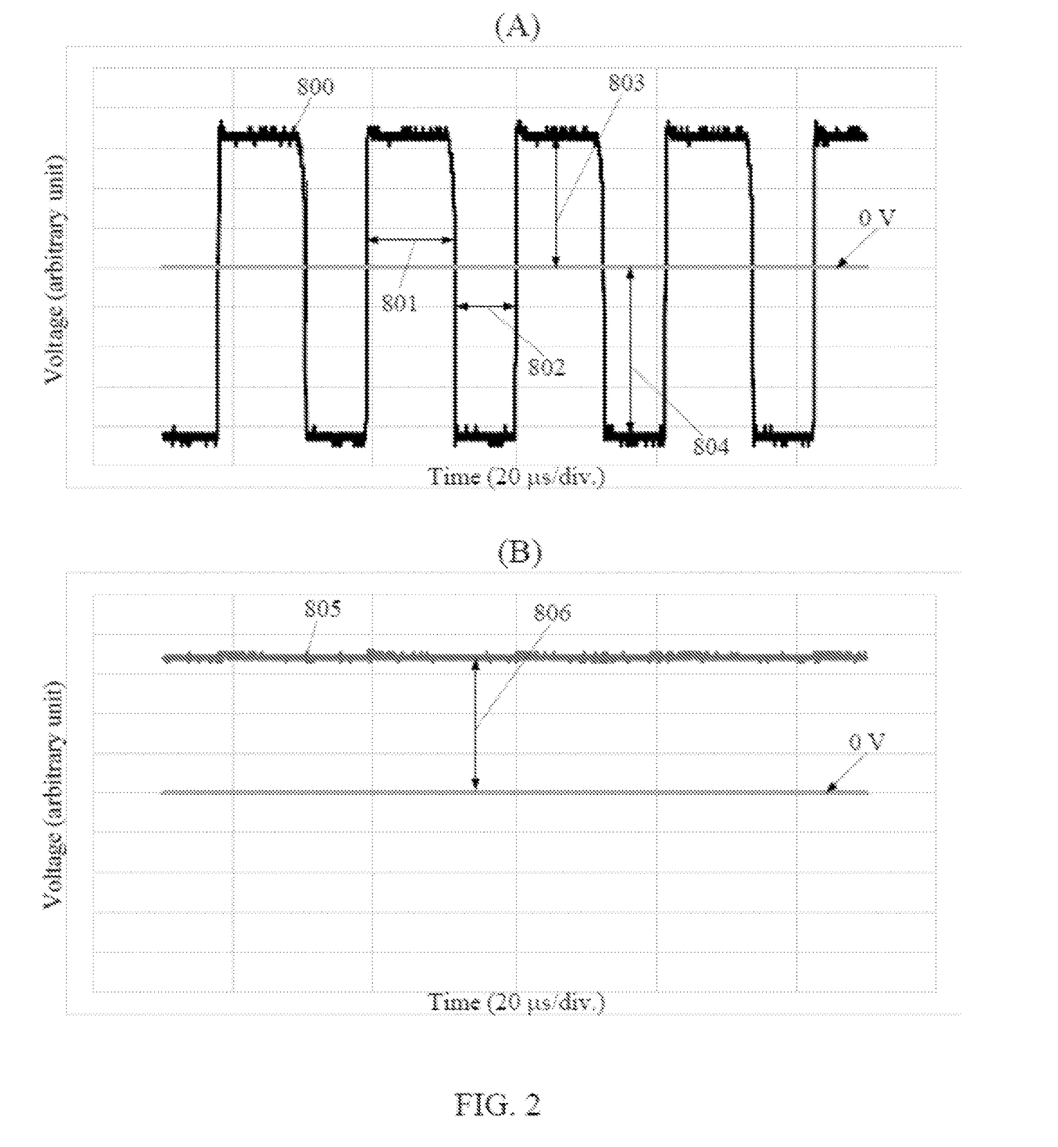
FIG. 2 is waveforms of an output voltage measured at a first switching transformer and a charging voltage according to the present disclosure.

FIG. 2 is waveforms of an output voltage measured at a first switching transformer and a charging voltage according to the present disclosure. In FIG. 2 (A), a waveform 800 of the output voltage measured at the third winding 407 (FIG. 1) of the first switching transformer 401 comprises a periodic voltage. When the at least one electronic switch 408 is turned off in the $t_{off}$ period 801, the first diode 410 is forward biased and conducts, and the output voltage with respect to the first ground reference 255 at 0 volt (V) goes to a high level representing a level of the charging voltage 803. When the at least one electronic switch 408 is turned on in the $t_{on}$ period 802, the first diode 410 is reverse biased and does not conduct, and the output voltage with respect to 0 V goes to a low level representing a voltage 804, which is minus $(N_2/N_1) \cdot V_{in}$, where $N_1$ is the turn number of the first winding 405, $N_2$ is the turn number of the third winding 407, and $V_{in}$ is the input DC voltage across the at least one input capacitor 404, as mentioned above. A reciprocal of a sum of $t_{on}$ and $t_{off}$ gives a switching frequency of 47 kHz with a duty cycle of 42%. In FIG. 2 (B), a voltage waveform 805 shows the charging voltage 806 with respect to 0 V.

Figure 3:
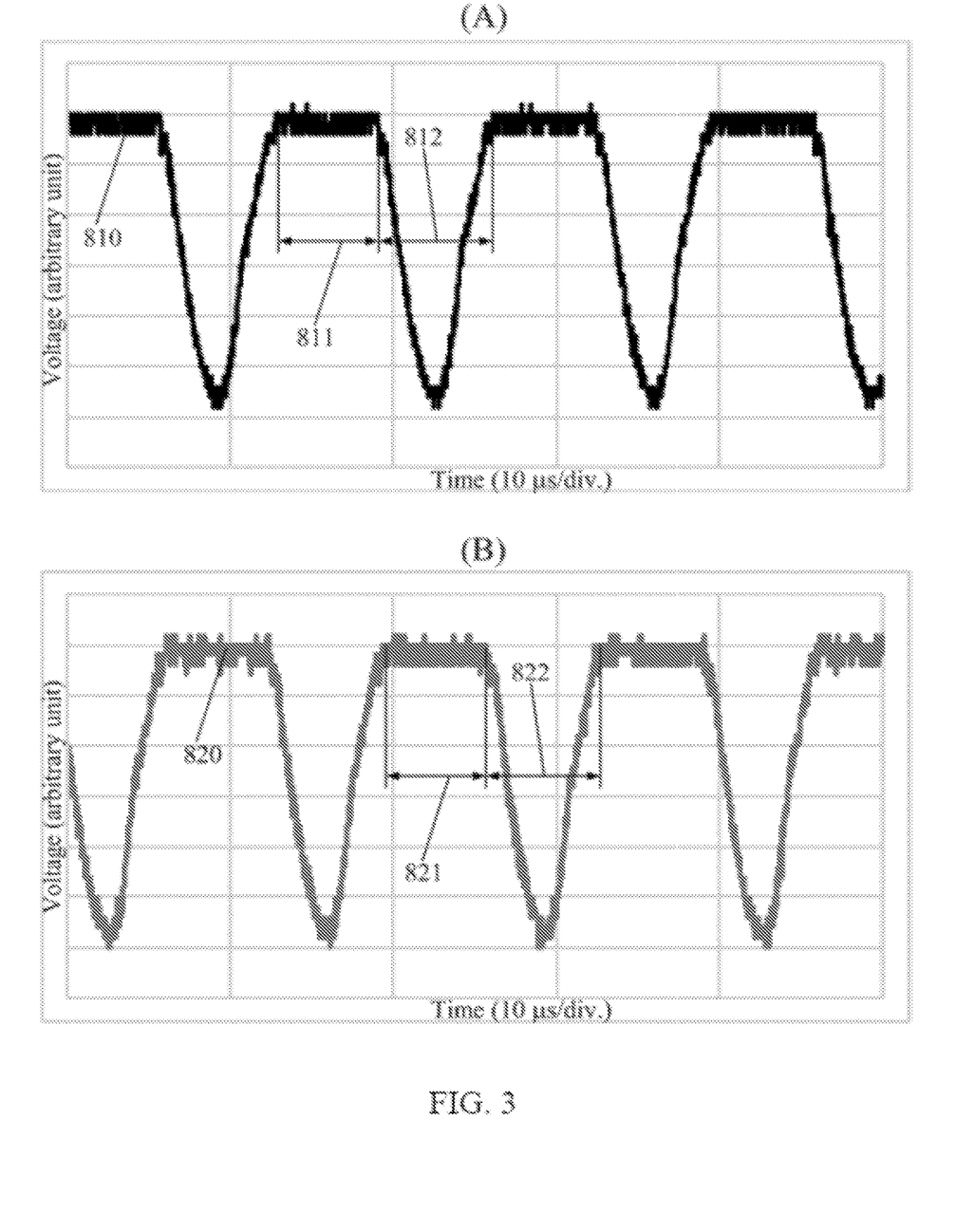
FIG. 3 is waveforms of a first control voltage and a second control voltage according to the present disclosure.

FIG. 3 is waveforms of a first control voltage and a second control voltage according to the present disclosure. In FIG. 3 (A), the first control voltage 810 comprises a periodic waveform comprising a first part 811 of a cycle and a second part 812 of the cycle, respectively comprising a flat-top waveform and a valley-shape waveform. The first control voltage 810 is configured to drive the first electronic switch 604 (FIG. 1) to turn on and off. In FIG. 3 (B), a second control voltage 820 comprises a first part 821 of a cycle and a second part 822 of the cycle, similar to those of the first control voltage 810 except that the second control voltage 820 is 180 degrees out-of-phase of the first control voltage 810. The second control voltage 820 is configured to drive the second electronic switch 605 to turn on and off. In other words, the first control voltage 810 and the second control voltage 820 create the bias voltages to operate the first electronic switch 604 and the second electronic switch 605 in alternate cycles, thus providing switching needed for actions of the second switching transformer 601. The LED driving circuit 600 uses transformer actions to transfer power from the primary winding 602 to the secondary winding 606, as opposed to other topologies, which store energy in an inductor in a first phase of switching cycles and transfer the energy to a load in a second phase.

Figure 4:
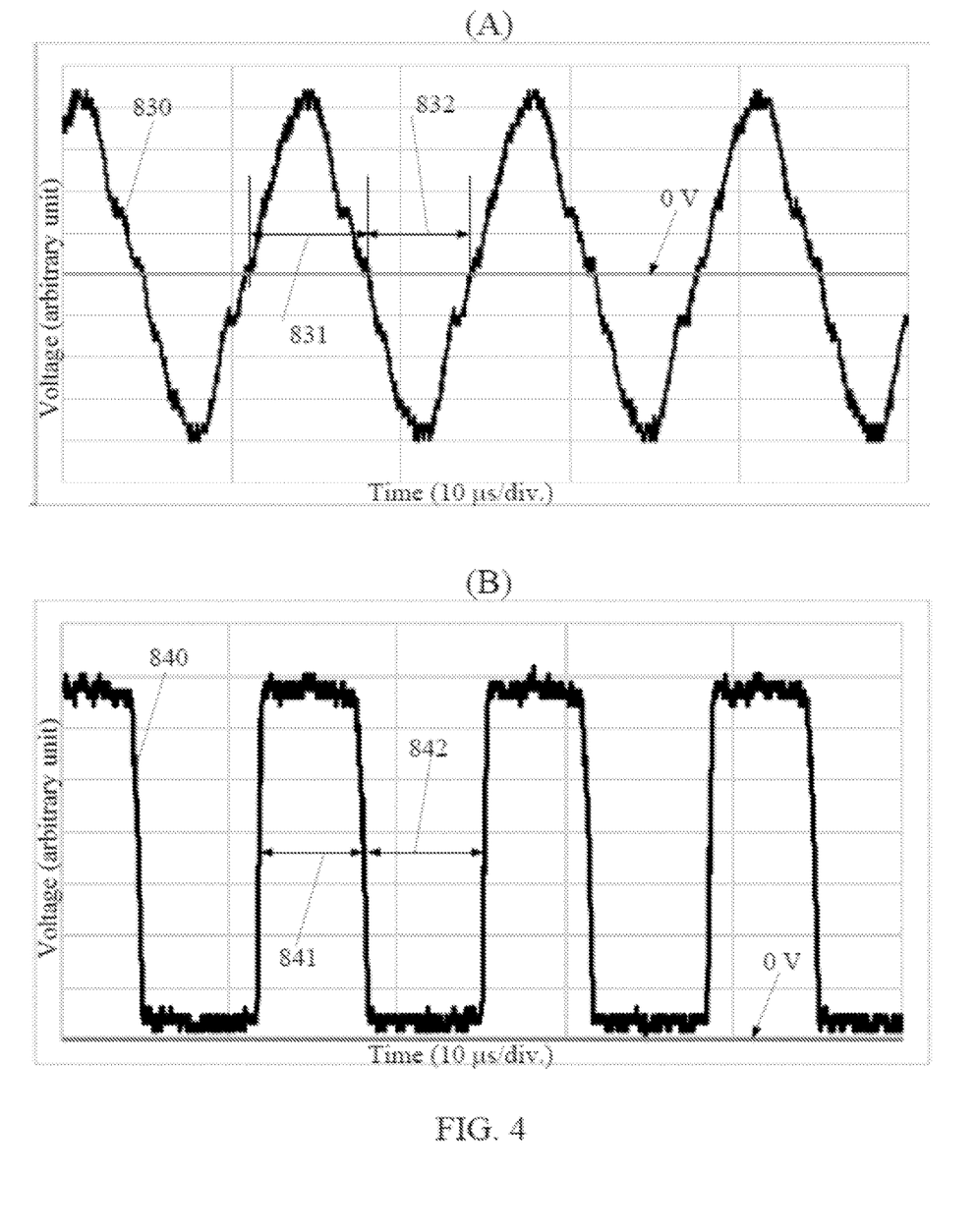
FIG. 4 is waveforms of an AC voltage across a primary winding and an output voltage across a secondary winding according to the present disclosure.

FIG. 4 is waveforms of an AC voltage across a primary winding and an output voltage across a secondary winding of a second switching transformer according to the present disclosure. In FIG. 4 (A), the AC voltage 830 across the primary winding 606 (FIG. 1) shows an alternate waveform. The AC voltage 830 comprising a first part 831 of a cycle and a second part 832 of the cycle, respectively comprising a positive half part and a negative half part. The positive half part and the negative half part in combination correspond to an induced voltage from the first control voltage 810 (FIG. 3) driving the first electronic switch 604 to turn on and off and the second control voltage 820 driving the second electronic switch 605 to turn on and off. In FIG. 4 (B), the output voltage 840 across the secondary winding 606 (FIG. 1) of the second switching transformer 601 comprises a first part 841 of a cycle and a second part 842 of the cycle, respectively corresponding to the first supplied voltage before a rectification process in the voltage reference and diode rectifier circuit 607 and to 0 V. The switching frequency is measured at 37 kHz with a calculated duty cycle of 47%.

Figure 5:
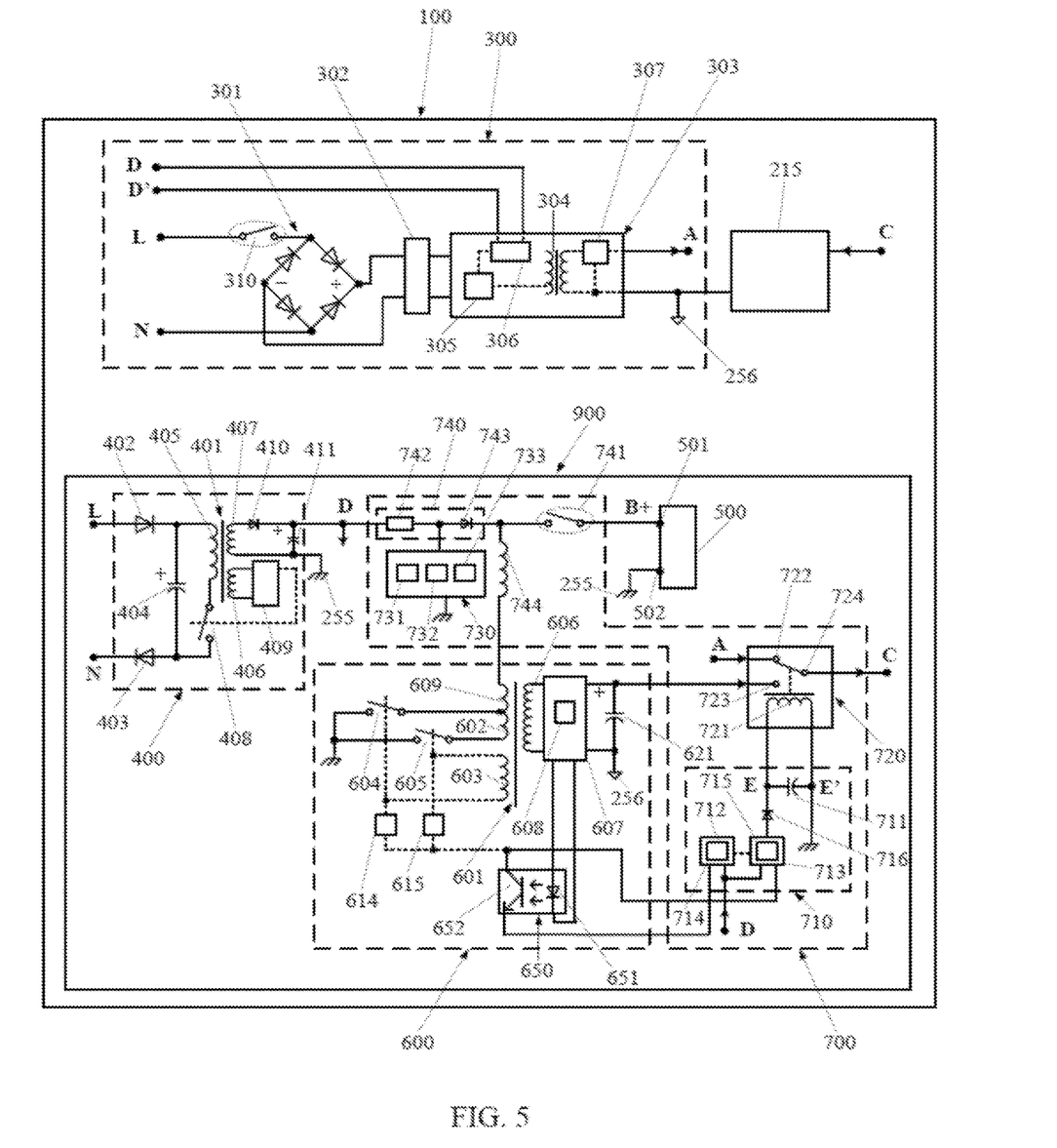
FIG. 5 is a block diagram of an LED luminaire with an emergency driver according to the present disclosure.

FIG. 5 is a block diagram of an LED luminaire with an emergency driver according to the present disclosure. In FIG. 5, the LED luminaire 100 comprises one or more LED arrays 215 with a forward voltage, a power supply unit 300 originally designed to receive the line voltage from the AC mains at ports denoted as "L" and "N", and an emergency driver 900. The power supply unit 300 comprises a power switch 310 configured to turn the power to the power supply unit 300 on or off. In other words, the power supply unit 300 receives the line voltage from switched AC mains. The emergency driver 900 is basically the same as depicted in FIG. 1. When the line voltage is inputted, the power supply unit 300 generates a second supplied voltage at a port "A" with respect to the second ground reference 256 and a rated current to normally operate the one or more LED arrays 215. When the line voltage is unavailable, the emergency driver 900 is automatically started to provide the first supplied voltage to the one or more LED arrays 215 to operate thereof.

In FIG. 5, the emergency driver 900 comprises a rechargeable battery 500, a charger circuit 400, an LED driving circuit 600, and a charging and discharging control circuit 700 comprising a relay switch 720. The relay switch 720 comprises a coil 721, a first input electrical terminal 722, and a second input electrical terminal 723. The charger circuit 400 comprises a first switching transformer 401 and a diode rectifier assembly comprising two rectifier diodes 402 and 403 respectively coupled to two electrical conductors denoted as "L" and "N" of alternate-current (AC) mains to receive the line voltage. The charger circuit 400 is configured to generate a charging voltage with respect to a first ground reference 255 to charge the rechargeable battery 500 when the line voltage is available. The rechargeable battery 500 comprises a positive potential terminal 501 and a negative potential terminal 502 with a terminal voltage across thereof. A voltage at the positive potential terminal 501 is denoted as B+ with respect to the negative potential terminal 502, which connects to the first ground reference 255. In FIG. 5, the two electrical conductors "L" and "N" are coupled to un-switched AC mains. The charger circuit 400 further comprises at least one input capacitor 404 coupled between the two rectifier diodes 402 and 403 and configured to smooth out an input direct-current (DC) voltage, $V_{in}$. The first switching transformer 401 comprises a first winding 405, a second winding 406, and a third winding 407. The charger circuit 400 further comprises at least one electronic switch 408, an auxiliary circuit 409, and a first diode rectifier circuit comprising a first diode 410 and a first capacitor 411. The first diode rectifier circuit is coupled to the third winding 407 and configured to rectify and smooth out an AC voltage from the third winding 407 to generate the charging voltage greater than a rated value of the terminal voltage. The at least one electronic switch 408 is coupled in series with the first winding 405 and configured to be controlled by the auxiliary circuit 409 to operate the charger circuit 400 in a switching mode. When the at least one electronic switch 408 is turned off in a time-off ($t_{off}$) period, the first diode 410 is forward biased and conducts, and an output voltage with respect to the first ground reference 255 from the third winding 407 is the charging voltage. When the at least one electronic switch 408 is turned on in a time-on ($t_{on}$) period, the first diode 410 is reverse biased and does not conduct, and the output voltage with respect to the first ground reference 255 goes to a low level representing a voltage of minus $(N_2/N_1) \cdot V_{in}$, where $N_1$ is a turn number of the first winding 405, $N_2$ is a turn number of the third winding 407, and $V_{in}$ is the input DC voltage across the at least one input capacitor 404.

In FIG. 5, the LED driving circuit 600 comprises a second switching transformer 601 and an optocoupler 650. The LED driving circuit 600 is configured to receive the terminal voltage and to convert the terminal voltage into a first supplied voltage with respect to a second ground reference 256 when the line voltage is unavailable. The optocoupler 650 comprises an infrared emitting diode 651 and a phototransistor 652 and is configured to operate in response to the first supplied voltage and to enable the relay switch 720 to relay the first supplied voltage and to operate the one or more LED arrays 215 when the line voltage is unavailable. The second switching transformer 601 comprises a primary winding 602 and an auxiliary winding 603. The LED driving circuit 600 further comprises a first electronic switch 604 and a second electronic switch 605, both coupled to the primary winding 602 and configured to control charging and discharging of the primary winding 602 and to operate the second switching transformer 601. The second switching transformer 601 further comprises a secondary winding 606 whereas the LED driving circuit 600 further comprises a voltage reference and diode rectifier circuit 607 comprising a second diode rectifier circuit 608. The LED driving circuit 600 further comprises an output capacitor 621 configured to smooth out a rectified voltage from the voltage reference and diode rectifier circuit 607 and to reduce voltage ripples in the first supplied voltage. The second diode rectifier circuit 608 is coupled to the secondary winding 606 and configured to convert an AC voltage from the secondary winding 606 into the first supplied voltage whereas the first supplied voltage is coupled to the second input electrical terminal 723 of the relay switch 720 to operate the one or more LED arrays 215 when the line voltage is unavailable.

The second switching transformer 601 further comprises a sensing winding 609 electrically coupled to the positive potential terminal 501 of the rechargeable battery 500 via an inductor 744 and magnetically coupled to the auxiliary winding 603. When the line voltage is available, the sensing winding 609 stores energy in an increasing magnetic field. When the line voltage is unavailable, a falling magnetic field in the sensing winding 609 reverses a voltage polarity and generates a first control voltage and a second control voltage on the auxiliary winding 603, respectively triggering the first electronic switch 604 and the second electronic switch 605 to turn on in a first part of a cycle and to turn off in a second part of a cycle. The secondary winding 606 combines the first part of the cycle and the second part of the cycle are combined in a full cycle representing a reciprocal of a switching frequency.

In FIG. 5, the charging and discharging control circuit 700 further comprises a transistor circuit assembly 710. The relay switch 720 is configured to relay the first supplied voltage to the one or more LED arrays 215 when the line voltage is unavailable. The relay switch 720 further comprises a pair of input electrical terminals denoted as "E" and "E'". The pair of input electrical terminals are configured to receive a pull-in voltage to operate the coil 721. The pull-in voltage is associated with the operation of the relay switch 720. It is a voltage required to cause the relay switch 720 to operate. It is related to drop-out voltage, which is the voltage at which the relay switch 720 returns to its rest position. The pull-in voltage is always greater than the drop-out voltage. The relay switch 720 further comprises an output electrical terminal 724 configured to relay either a second supplied voltage provided by the power supply unit 300 or the first supplied voltage to the output electrical terminal 724. The second supplied voltage is configured to appear at the first input electrical terminal 722 when the line voltage is available whereas the first supplied voltage is configured to appear at the second input electrical terminal 723 when the line voltage is unavailable. The transistor circuit assembly 710 further comprises a first transistor circuit 712, a second transistor circuit 713 coupled to the first transistor circuit 712, a current guided diode 716, a second capacitor 711 coupled in parallel with the coil 721. Both the first transistor circuit 712 and the second transistor circuit 713 are further coupled to the phototransistor 652 to receive bias voltages and to build up the pull-in voltage across the second capacitor 711 to operate the coil 721 when the line voltage is unavailable.

In FIG. 5, the infrared emitting diode 651 and the phototransistor 652 are respectively coupled to the secondary winding 606 and the auxiliary winding 603. When the first electronic switch 604 and the second electronic switch 605 are turned on and off in an alternate part of the cycle, the first supplied voltage is built up to increase a current flowing through the infrared emitting diode 651, thereby transferring a high-level voltage signal to the phototransistor 652. In this sense, the optocoupler 650 is configured to transfer a digital signal of "1". On the other hand, when the first supplied voltage becomes unavailable, the optocoupler 650 is configured to transfer a digital signal of "0". That is to say that the optocoupler 650 is configured to operate in response to the first supplied voltage. The high-level voltage signal renders to enable the charging and discharging control circuit 700 and to operate the coil 721 when the line voltage is unavailable. In other words, the high-level voltage signal at the phototransistor 652 is configured to feed the transistor circuit assembly 710 to operate the coil 721 when the line voltage is unavailable.

In FIG. 5, the first transistor circuit 712 and the second transistor circuit 713 respectively comprise a first transistor 714 and a second transistor 715 whereas both the first transistor 714 and the second transistor 715 are configured to receive the charging voltage. When the line voltage is available, the first transistor 714 is turned on with the second transistor 715 turned off to disable the coil 721, thereby relaying the second supplied voltage to the one or more LED arrays 215 to operate thereof. When the line voltage becomes available in an event of power outage, the charging voltage appears to turn on the first transistor 714 and to pull down the high-level voltage signal. When the high-level voltage signal is pulled down, both the first electronic switch 604 and the second electronic switch 605 are disabled to inactivate the second switching transformer 601 with the first supplied voltage shut down. In FIG. 5, the LED driving circuit 600 further comprises a first resistor 614 and a second resistor 615 respectively coupled between the first electronic switch 604 and the phototransistor 652 and between the second electronic switch 605 and the phototransistor 652 to balance out a voltage difference.

In FIG. 5, the charging and discharging control circuit 700 further comprises a status indicator circuit 730 comprising three color LED indicators 731, a Zener diode 732, and a third transistor 733. The Zener diode 732 and the third transistor 733 are configured to detect charging conditions and to control the three color LED indicators 731 to individually light up in response to the charging conditions whereas the charging conditions comprise availability of the line voltage, a normal battery charging condition, and a charging malfunction. In FIG. 5, the charging and discharging control circuit 700 further comprises a current sensing circuit 740 and at least one pair of electrical contacts 741 coupled between the rechargeable battery 500 and the current sensing circuit 740. The at least one pair of electrical contacts 741 is configured to connect to the rechargeable battery 500 for charging and discharging thereof and to prevent the rechargeable battery 500 from being drained when not in use. The at least one pair of electrical contacts 741 comprise electrical contacts in a switch, a relay, and a jumper, or electrical terminals accommodated for jumper wires. The current sensing circuit 740 comprises a sensing resistor 742 and a diode 743. When the charging voltage is available to charge the rechargeable battery 500, a voltage drop is across the sensing resistor 742. The status indicator circuit 730 detects the voltage drop and determines that it is the normal battery charging condition. When the rechargeable battery 500 is not connected with the current sensing circuit 740, or a charging current is prohibited due to a malfunction of the rechargeable battery 500, the voltage drop is not available. In this case, the status indicator circuit 730 determines that it is the charging malfunction. Once the charging voltage is available, the status indicator circuit 730 determines that the line voltage is available and makes one of the color LED indicators associated with such an indication to light up. Each of the at least one electronic switch 408, the first electronic switch 604, and the second electronic switch 605 comprises either a metal-oxide semiconductor field-effect transistor (MOSFET) or a bipolar junction transistor (BJT).

In FIG. 5, the power supply unit 300 further comprises a main full-wave rectifier 301 and at least one input filter 302. The main full-wave rectifier 301 is coupled to receive the line voltage from the switched AC mains to convert it into a main DC voltage. The at least one input filter 302 is configured to suppress electromagnetic interference (EMI) noises. The power supply unit 300 further comprises a power switching converter 303 comprising a main transformer 304 and a power factor correction (PFC) and power switching circuit 305. The PFC and power switching circuit 305 is coupled to the main full-wave rectifier 301 via the at least one input filter 302 and configured to improve a power factor, to reduce voltage ripples, and to convert the main DC voltage into the second supplied voltage. The second supplied voltage with respect to the second ground reference 256 is configured to couple to the one or more LED arrays 215 to operate thereon when the line voltage is available. The power switching converter 303 further comprises a pulse width modulation (PWM) control circuit 306 and a pair of dimming input ports denoted as "DD'" configured to receive a 0-to-10 V signal, a 1-to-10 V signal, a PWM signal, or a signal from a variable resistor for luminaire dimming applications. The PFC and power switching circuit 305 is a current source. The power switching converter 303 further comprises a rectifiers and filter 307 configured to generate the second supplied voltage. When the line voltage is available, the second supplied voltage will appear at the first electrical terminal "A" in the emergency driver 900 and loop back to the one or more LED arrays 215 via the output electrical terminal "C" to operate thereof.

Whereas preferred embodiments of the present disclosure have been shown and described, it will be realized that alterations, modifications, and improvements may be made thereto without departing from the scope of the following claims. Another kind of schemes with an emergency driver adopted in an LED luminaire to operate thereof using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire emergency driver, comprising:
   two electrical conductors configured to couple to alternate-current (AC) mains to receive a line voltage;
   a rechargeable battery comprising a positive potential terminal and a negative potential terminal with a terminal voltage across thereof;
   a charger circuit comprising a first switching transformer, the charger circuit coupled to the two electrical conductors and configured to generate a charging voltage with respect to a first ground reference to charge the rechargeable battery when the line voltage is available;
   an LED driving circuit comprising a second switching transformer and an optocoupler configured to feedback-control the second switching transformer, wherein the LED driving circuit is configured to receive the terminal voltage and to convert the terminal voltage into a first supplied voltage with respect to a second ground reference when the line voltage is unavailable; and
   a charging and discharging control circuit comprising a transistor circuit assembly and a relay switch comprising a coil coupled to the transistor circuit assembly, the relay switch configured to relay the first supplied voltage to external LED arrays to operate thereof when the line voltage is unavailable,
   wherein:
   the relay switch comprises a first input electrical terminal, a second input electrical terminal, and a pair of input electrical terminals, wherein the pair of input electrical terminals are configured to receive a pull-in voltage to operate the coil;
   the relay switch further comprises an output electrical terminal configured to relay either a second supplied voltage provided by an external power supply unit or the first supplied voltage to the output electrical terminal, wherein the second supplied voltage is configured to appear at the first input electrical terminal when the line voltage is available, and wherein the first supplied voltage is configured to appear at the second input electrical terminal when the line voltage is unavailable; and the optocoupler comprises an infrared emitting diode and a phototransistor configured to receive optical signals emitting from the infrared emitting diode, wherein the optocoupler is configured to operate in response to the first supplied voltage and to enable the relay switch to relay the first supplied voltage to the output electrical terminal and to operate the external LED arrays when the line voltage is unavailable.

2. The LED luminaire emergency driver of claim 1, wherein the transistor circuit assembly further comprises a first transistor circuit, a second transistor circuit coupled to the first transistor circuit, and a capacitor coupled in parallel with the coil, and wherein both the first transistor circuit and the second transistor circuit are further coupled to the phototransistor to receive bias voltages and to build up the pull-in voltage across the capacitor to operate the coil when the line voltage is unavailable.

3. The LED luminaire emergency driver of claim 2, wherein the first transistor circuit and the second transistor circuit respectively comprise a first transistor and a second transistor, wherein both the first transistor and the second transistor are configured to receive the charging voltage, and wherein, when the line voltage is available, the first transistor is turned on with the second transistor turned off to disable the coil, thereby relaying the second supplied voltage to the external LED arrays to operate thereof.

4. The LED luminaire emergency driver of claim 1, wherein the charging and discharging control circuit further comprises a status indicator circuit comprising three color LED indicators, a Zener diode, and a third transistor, wherein the Zener diode and the third transistor are configured to detect charging conditions and to control the three color LED indicators to individually light up in response to the charging conditions, and wherein the charging conditions comprise availability of the line voltage, a normal battery charging condition, and a charging malfunction.

5. The LED luminaire emergency driver of claim 1, wherein the first switching transformer comprises a first winding, a second winding, and a third winding, wherein the charger circuit further comprises at least one electronic switch coupled to the first winding, an auxiliary circuit coupled to the second winding, and a first diode rectifier circuit coupled to the third winding, wherein the at least one electronic switch is configured to be controlled by the auxiliary circuit to operate the charger circuit in a switching mode, and wherein the first diode rectifier circuit is configured to generate the charging voltage greater than a rated value of the terminal voltage.

6. The LED luminaire emergency driver of claim 1, wherein the second switching transformer comprises a primary winding and an auxiliary winding, wherein the LED driving circuit further comprises a first electronic switch and a second electronic switch, and wherein both the first electronic switch and the second electronic switch are configured to couple to the primary winding to control charging and discharging of the primary winding and to operate the second switching transformer in a switching mode.

7. The LED luminaire emergency driver of claim 6, wherein the second switching transformer further comprises a secondary winding, wherein the LED driving circuit further comprises a voltage reference and diode rectifier circuit comprising a second diode rectifier circuit coupled to the secondary winding and configured to convert an AC voltage from the secondary winding into the first supplied voltage, and wherein the first supplied voltage is coupled to the second input electrical terminal of the relay switch to operate the external LED arrays when the line voltage is unavailable.

8. The LED luminaire emergency driver of claim 7, wherein the second switching transformer further comprises a sensing winding magnetically coupled to the auxiliary winding, wherein, when the line voltage is available, the sensing winding stores energy in an increasing magnetic field, wherein, when the line voltage is unavailable, a falling magnetic field in the sensing winding reverses a voltage polarity and generates a first control voltage and a second control voltage on the auxiliary winding, respectively triggering the first electronic switch and the second electronic switch to turn on in a first part of a cycle and to turn off in a second part of the cycle, and wherein the first part of the cycle and the second part of the cycle are combined in a full cycle representing a reciprocal of a switching frequency.

9. The LED luminaire emergency driver of claim 8, wherein the infrared emitting diode and the phototransistor are respectively coupled to the secondary winding and the auxiliary winding, wherein, when the first electronic switch and the second electronic switch are respectively turned on and off in an alternate part of the cycle, the first supplied voltage is built up with an increasing current flowing through the infrared emitting diode, thereby transferring a high-level voltage signal to the phototransistor, and wherein the high-level voltage signal renders to enable the charging and discharging control circuit and to operate the coil when the line voltage is unavailable.

10. The LED luminaire emergency driver of claim 9, wherein, when the line voltage becomes available in an event of power outage, the charging voltage appears to turn on the first transistor and to pull down the high-level voltage signal with both the first electronic switch and the second electronic switch disabled to inactive the second switching transformer.

11. The LED luminaire emergency driver of claim 1, wherein the charging and discharging control circuit further comprises a current sensing circuit and at least one pair of electrical contacts coupled between the rechargeable battery and the current sensing circuit, wherein the at least one pair of electrical contacts is configured to connect to the rechargeable battery for charging and discharging thereof and to prevent the rechargeable battery from being drained when not in use.

12. A light-emitting diode (LED) luminaire, comprising:
one or more LED arrays with an LED forward voltage;
a power supply unit, comprising:
two main electrical conductors;
a main full-wave rectifier coupled to the two main electrical conductors, the main full-wave rectifier configured to convert a line voltage inputted from the two main electrical conductors into a main direct-current (DC) voltage; and
a power switching converter comprising a main transformer and a power factor correction (PFC) and power switching circuit, wherein the PFC and power switching circuit is coupled to the main full-wave rectifier via an input filter and configured to improve a power factor, to reduce voltage ripples, and to convert the main DC voltage into a second supplied voltage configured to couple to the one or more LED arrays to operate thereof when the line voltage is available; and
an LED luminaire emergency driver, comprising:

two electrical conductors configured to couple to alternate-current (AC) mains to receive the line voltage;

a rechargeable battery comprising a positive potential terminal and a negative potential terminal with a terminal voltage across thereof;

a charger circuit comprising a first switching transformer, the charger circuit coupled to the two electrical conductors and configured to generate a charging voltage with respect to a first ground reference to charge the rechargeable battery when the line voltage is available;

an LED driving circuit comprising a second switching transformer and an optocoupler configured to feedback-control the second switching transformer, wherein the LED driving circuit is configured to receive the terminal voltage and to convert the terminal voltage into a first supplied voltage with respect to a second ground reference when the line voltage is unavailable; and a charging and discharging control circuit comprising a transistor circuit assembly and a relay switch comprising a coil coupled to the transistor circuit assembly, the relay switch configured to relay the first supplied voltage to the one or more LED arrays to operate thereof when the line voltage is unavailable, wherein:

the relay switch comprises a first input electrical terminal, a second input electrical terminal, and a pair of input electrical terminals, wherein the pair of input electrical terminals are configured to receive a pull-in voltage to operate the coil;

the relay switch further comprises an output electrical terminal configured to relay either the second supplied voltage provided by the power supply unit or the first supplied voltage to the output electrical terminal, wherein the second supplied voltage is configured to appear at the first input electrical terminal when the line voltage is available, and wherein the first supplied voltage is configured to appear at the second input electrical terminal when the line voltage is unavailable; and the optocoupler comprises an infrared emitting diode and a phototransistor configured to receive optical signals emitting from the infrared emitting diode, wherein the optocoupler is configured to operate in response to the first supplied voltage and to enable the relay switch to relay the first supplied voltage to the output electrical terminal and to operate the one or more LED arrays when the line voltage is unavailable.

13. The light emitting diode (LED) luminaire of claim 12, wherein the transistor circuit assembly further comprises a first transistor circuit, a second transistor circuit coupled to the first transistor circuit, and a capacitor coupled in parallel with the coil, and wherein both the first transistor circuit and the second transistor circuit are further coupled to the phototransistor to receive bias voltages and to build up the pull-in voltage across the capacitor to operate the coil when the line voltage is unavailable.

14. The light emitting diode (LED) luminaire of claim 13, wherein the first transistor circuit and the second transistor circuit respectively comprise a first transistor and a second transistor, wherein both the first transistor and the second transistor are configured to receive the charging voltage, and wherein, when the line voltage is available, the first transistor is turned on with the second transistor turned off to disable the coil, thereby relaying the second supplied voltage to the one or more LED arrays to operate thereof.

15. The light emitting diode (LED) luminaire of claim 12, wherein the charging and discharging control circuit further comprises a status indicator circuit comprising three color LED indicators, a Zener diode, and a third transistor, wherein the Zener diode and the third transistor are configured to detect charging conditions and to control the three color LED indicators to individually light up in response to the charging conditions, and wherein the charging conditions comprise availability of the line voltage, a normal battery charging condition, and a charging malfunction.

16. The light emitting diode (LED) luminaire of claim 12, wherein the first switching transformer comprises a first winding, a second winding, and a third winding, wherein the charger circuit further comprises at least one electronic switch coupled to the first winding, an auxiliary circuit coupled to the second winding, and a first diode rectifier circuit coupled to the third winding, wherein the at least one electronic switch is configured to be controlled by the auxiliary circuit to operate the charger circuit in a switching mode, and wherein the first diode rectifier circuit is configured to generate the charging voltage greater than a rated value of the terminal voltage.

17. The light emitting diode (LED) luminaire of claim 12, wherein the second switching transformer comprises a primary winding and an auxiliary winding, wherein the LED driving circuit further comprises a first electronic switch and a second electronic switch, and wherein both the first electronic switch and the second electronic switch are configured to couple to the primary winding to control charging and discharging of the primary winding and to operate the second switching transformer in a switching mode.

18. The light emitting diode (LED) luminaire of claim 17, wherein the second switching transformer further comprises a secondary winding, wherein the LED driving circuit further comprises a voltage reference and diode rectifier circuit comprising a second diode rectifier circuit coupled to the secondary winding and configured to convert an AC voltage from the secondary winding into the first supplied voltage, and wherein the first supplied voltage is coupled to the second input electrical terminal of the relay switch to operate the one or more LED arrays when the line voltage is unavailable.

19. The light emitting diode (LED) luminaire of claim 18, wherein the second switching transformer further comprises a sensing winding magnetically coupled to the auxiliary winding, wherein, when the line voltage is available, the sensing winding stores energy in an increasing magnetic field, wherein, when the line voltage is unavailable, a falling magnetic field in the sensing winding reverses a voltage polarity and generates a first control voltage and a second control voltage on the auxiliary winding, respectively triggering the first electronic switch and the second electronic switch to turn on in a first part of a cycle and to turn off in a second part of a cycle, and wherein the first part of the cycle and the second part of the cycle are combined in a full cycle representing a reciprocal of a switching frequency.

20. The light emitting diode (LED) luminaire of claim 19, wherein the infrared emitting diode and the phototransistor are respectively coupled to the secondary winding and the auxiliary winding, wherein, when the first electronic switch and the second electronic switch are respectively turned on and off in an alternate part of the cycle, the first supplied voltage is built up with an increasing current flowing through the infrared emitting diode, thereby transferring a high-level voltage signal to the phototransistor, and wherein the high-level voltage signal renders to enable the charging and discharging control circuit and to operate the coil when the line voltage is unavailable.

* * * * *